Patented May 22, 1951

2,554,472

UNITED STATES PATENT OFFICE 2,554,472

PROCESS OF PREPARING 21-IODO-PREG-NENE-(5)-OL-(3)-ONE-(20)

Heinrich Ruschig, Frankfort-on-the-Main, Germany, assignor to Farbwerke Hoechst vormals Meister Lucius & Bruning, Frankfort-on-the-Main-Hoechst, Germany No Drawing. Application April 27, 1949, Serial No. 90,036. In Germany October 1, 1948

4 Claims. (Cl. 260—397.4)

The present invention relates to a process of preparing 21-iodo-pregnene-(5)-ol-(3)-one-(20).

The French Patent No. 891,441 describes the manufacture of derivatives of 21-hydroxy-pregnene-(5)-ol-(3)-one-(20) which consists in treating pregnene-(5)-ol-(3)-one-(20)-oxalic acid-(21) in the form of its water-soluble salts with iodine and a basic agent and causing the 21-iodo-pregnene-(5)-ol-(3)-one-(20) obtained to react with a salt of an organic acid or another compound capable of effecting the replacement of the iodine.

Now I have found that 21-iodo-pregnene-(5)-ol-(3)-one-(20) is obtained in a technically simpler manner and in a better yield than described in the French patent cited above, by effecting the introduction of iodine with exclusion of water.

The process of manufacture of the invention comprises the reaction of a salt of pregnene-(5)-ol-(3)-one-(20)-oxalic acid-(21) at a low temperature with iodine in an organic solvent miscible with water and precipitation of the product with an alkaline salt solution.

The process is, for instance, carried out as follows: the sodium salt of pregnene-(5)-ol-(3)-one-(20)-oxalic acid ester-(21) is hydrolyzed with the calculated quantity of potassium hydroxide solution in a solvent miscible with water, for instance methyl-, ethyl- or propyl-alcohol, and to the potassium-sodium-salt of the pregnene-(5)-ol-(3)-one-(20)-oxalic acid-(21) thus obtained in the form of a thick magma, the calculated quantity of iodine in alcohol, for instance methyl-, ethyl- or propyl-alcohol, is added, drop by drop, at a low temperature. During this operation the potassium salt of 21-iodo-pregnene-(5)-ol-(3)-one-(20)-oxalic acid-(21) is formed as an intermediate product, this being evident by the gradual transformation of the thick magma into a clear solution.

When the addition of iodine is complete, the clear solution is poured into a previously cooled alkaline electrolyte solution, for instance an alkali chloride solution or an alkali phosphate solution. During this procedure the product desired precipitates at once. It may readily be obtained in the pure state by dissolving in methyl alcohol and afterwards precipitating with water, but it is also possible to cause the crude product to react at once so as to obtain, for example, the 21-acetoxy-pregnene-(5)-ol-(3)-one-(20).

The following examples serve to illustrate the invention, but they are not intended to limit it thereto:

Example 1

2.19 grams ($\frac{1}{200}$ mol) of the sodium salt of pregnene-(5)-ol-(3)-one-(20)-oxalic acid ethyl ester-(21) are heated for 1 hour under reflux, while stirring, with 10.8 cc. of ethyl-alcoholic potassium hydroxide solution (KOH-content=0.28 gram [$\frac{1}{200}$ mol]). To the thick, magma-like reaction mass which has been cooled in a mixture of ice and sodium chloride, there is slowly added, drop by drop, while stirring, a cooled methyl-alcoholic iodine solution containing 1.27 grams of iodine ($\frac{1}{200}$ mol) in 30 cc. of methyl alcohol. During this operation the precipitated product gradually dissolves within 20 minutes. The clear reaction solution is then poured into 500 cc. of a cooled sodium chloride solution (12.5 grams of sodium chloride in 500 cc. of water). A solution of 1 gram of potassium hydroxide in 20 cc. of water is then added. The 21-iodo-pregnene-(5)-ol-(3)-one-(20) separates immediately in the form of flakes. It is allowed to stand for some time, then centrifuged and precipitated in the crystalline form from solution in methyl alcohol with water. The yield amounts to 1.64 grams. The melting point is 153° C. with decomposition.

Example 2

8.76 grams ($\frac{2}{100}$ mol) of the sodium salt of the pregnene-(5)-ol-(3)-one-(20)-oxalic acid ethyl ester-(21) are reacted for 1 hour under reflux, while stirring, with 43.2 cc. of ethyl-alcoholic potassium hydroxide solution (KOH-content=1.12 grams [$\frac{2}{100}$ mol]). After cooling in a mixture of sodium chloride and ice, a cooled iodine solution prepared from 6.08 grams ($\frac{2}{100}$ mol) of iodine and 120 cc. of methyl alcohol is slowly added, drop by drop, while stirring, to the magma-like reaction mass. During this operation the precipitate slowly disappears. The clear reaction solution is then poured into 2 liters of ice water containing 50 grams of sodium chloride and after the addition of 4 grams of potassium hydroxide in 80 cc. of water, the whole is allowed to stand for some time. During this procedure, the 21-iodo-pregnene-(5)-ol-(3)-one-(20) separates which is filtered by suction and finally well dried. The decomposition point of the crude product is 149–153° C.

The dry crude product is caused to react at once with freshly prepared potassium acetate in acetone as described in the French patent cited above, so as to obtain 21-acetoxy-pregnene-(5)-ol-(3)-one-(20).

The yield amounts to 4.15 grams. The melting point is 179–180° C.

I claim:

1. A process of preparing 21-iodo-pregnene-(5)-ol-(3)-one-(20) which comprises treating pregnene-(5)-ol-(3)-one-(20)-oxalic acid-(21) in the form of its alkali salts with iodine in the absence of water at a low temperature in a solvent mixable with water and adding an alkaline salt solution.

2. A process of preparing 21-iodo-pregnene-(5)-ol-(3)-one-(20) which comprises treating pregnene-(5)-ol-(3)-one-(20)-oxalic acid-(21) in the form of its mixed potassium-sodium salts with iodine in the absence of water at a low temperature in a solvent mixable with water and adding an alkaline salt solution.

3. A process of preparing 21-iodo-pregnene-(5)-ol-(3)-one-(20) which comprises treating pregnene-(5)-ol-(3)-one-(20)-oxalic acid-(21) in the form of its potassium salts with iodine in the absence of water at a low temperature in a solvent mixable with water and adding an alkaline salt solution.

4. A process of preparing 21-iodo-pregnene-(5)-ol-(3)-one-(20) which comprises treating pregnene-(5)-ol-(3)-one-(20)-oxalic acid-(21) in the form of its sodium salts with iodine in the absence of water at a low temperature in a solvent mixable with water and adding an alkaline salt solution.

HEINRICH RUSCHIG.

REFERENCES CITED

The following references are of record in the file of this patent:

FOREIGN PATENTS

| Number | Country | Date |
|--------|---------|------|
| 891,441 | France | Dec. 11, 1943 |